(12) United States Patent
Pan et al.

(10) Patent No.: US 9,769,695 B2
(45) Date of Patent: Sep. 19, 2017

(54) ADAPTIVE QUALITY OF SERVICE FOR WIDE AREA NETWORK TRANSPORT

(71) Applicant: CISCO TECHNOLOGY, INC., San Jose, CA (US)

(72) Inventors: Rong Pan, Saratoga, CA (US); Xiaoqing Zhu, Austin, TX (US); Shitanshu V. Shah, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 183 days.

(21) Appl. No.: 14/532,912

(22) Filed: Nov. 4, 2014

(65) Prior Publication Data

US 2016/0127944 A1    May 5, 2016

(51) Int. Cl.
| | | |
|---|---|---|
| H04W 28/02 | (2009.01) | |
| H04L 12/815 | (2013.01) | |
| H04L 12/729 | (2013.01) | |
| H04L 12/727 | (2013.01) | |
| H04L 12/851 | (2013.01) | |

(52) U.S. Cl.
CPC ......... H04W 28/0236 (2013.01); H04L 47/22 (2013.01); H04L 45/121 (2013.01); H04L 45/125 (2013.01); H04L 47/2425 (2013.01)

(58) Field of Classification Search
None
See application file for complete search history.

(56) References Cited

U.S. PATENT DOCUMENTS

| | | | |
|---|---|---|---|
| 6,778,499 B1* | 8/2004 | Senarath | .......... H04L 47/10 370/232 |
| 7,010,611 B1 | 3/2006 | Wiryaman et al. | |
| 7,912,056 B1 | 3/2011 | Brassem | |
| 8,713,197 B1 | 4/2014 | Li | |
| 8,788,640 B1 | 7/2014 | Masters | |
| 8,811,160 B2 | 8/2014 | Morrill et al. | |
| 2002/0172229 A1* | 11/2002 | Parvin | ................ H03L 7/00 370/521 |

(Continued)

OTHER PUBLICATIONS

Schulzrinne, et al., "RTP: A Transport Protocol for Real-Time Applications," Network Working Group, RFC 1889, Jan. 1996, 75 pages; http://www.ietf.org/rfc/rfc1889.txt.
Heinanen, et al., "A Single Rate Three Color Marker," Network Working Group, RFC 2697, Sep. 1999, 6 pages; http://www.ietf.org/rfc/rfc2697.txt.
Heinanen, et al., "A Two Rate Three Color Marker," Network Working Group, RFC 2698, Sep. 1999, 5 pages; http://www.ietf.org/rfc/rfc2698.txt.

(Continued)

*Primary Examiner* — Jeffrey M Rutkowski
*Assistant Examiner* — Andre Tacdiran

(57) ABSTRACT

An example method is provided and includes determining a time shift comprising a difference in time between a packet count observation at a transmit element and a corresponding packet count observation at a receive element connected to the transmit element via a link; obtaining a first packet count from the transmit element and a second packet count from the receive element; and adjusting at least one of the first packet count and the second packet count to compensate for the time shift. The method further includes comparing the adjusted first and second packet counts to determine whether there is a discrepancy between the counts and if a discrepancy is detected between the counts, adjusting a rate at which the transmit element sends packets to the receive element.

20 Claims, 7 Drawing Sheets

(56) References Cited

U.S. PATENT DOCUMENTS

| | | | | |
|---|---|---|---|---|
| 2005/0039103 A1* | 2/2005 | Azenko | ............ | H03M 13/1515 714/776 |
| 2006/0140188 A1* | 6/2006 | Shearer | ............... | G06F 13/4208 370/394 |
| 2010/0254262 A1* | 10/2010 | Kantawala | ............... | H04L 12/56 370/232 |
| 2010/0284424 A1* | 11/2010 | Eitan | ...................... | H04L 1/0002 370/470 |
| 2011/0228834 A1* | 9/2011 | Umayabashi | ............. | H03L 7/08 375/224 |
| 2013/0170390 A1* | 7/2013 | Umayabashi | ....... | H04L 43/0852 370/252 |
| 2013/0322255 A1* | 12/2013 | Dillon | ..................... | H04L 47/22 370/236 |
| 2014/0307562 A1* | 10/2014 | Bruckman | .......... | H04L 43/0835 370/241.1 |
| 2015/0089045 A1* | 3/2015 | Agarwal | ................. | H04L 43/04 709/224 |
| 2015/0381733 A1* | 12/2015 | Masuda | .................... | H04L 9/36 709/217 |
| 2016/0057249 A1* | 2/2016 | Karthikeyan | ....... | H04L 65/4076 709/219 |

OTHER PUBLICATIONS

Schulzrinne, et al., "RTP: A Transport Protocol for Real-Time Applications," Network Working Group, RFC 3550, Jul. 2003, 89 pages; http://www.ietf.org/rfc/rfc3550.txt.

Floyd, et al., "Problem Statement for the Datagram Congestion Control Protocol (DCCP)," Network Working Group, RFC 4336, Mar. 2006, 22 pages; http://www.ietf.org/rfc/rfc4336.txt.

Kohler, et al., "Datagram Congestion Control Protocol (DCCP)," Network Working Group, RFC 4340, Mar. 2006, 129 pages; http://www.ietf.org/rfc/rfc4340.txt.

Floyd, et al., "Profile for Datagram Congestion Control Protocol (DCCP) Congestion Control ID 2: TCP-like Congestion Control," Network Working Group, RFC 4341, Mar. 2006, 20 pages; http://www.ietf.org/rfc/rfc4341.txt.

Floyd, et al., "Profile for Datagram Congestion Control Protocol (DCCP) Congestion Control ID 3: TCP-friendly rate Control (TFRC)," Network Working Group, RFC 4342, Mar. 2006, 43 pages; http://www.ietf.org/rfc/rfc4342.txt.

Jacobs, et al., "Real-Time Dynamic Rate Shaping and Control for Internet Video Applications," Workshop on Multimedia Signal Processing, Princeton, NJ, Jun. 23-25, 1997, Mar. 1, 1997, 9 pages; http://www.ee.columbia.edu/In/dvmm/publications/97/mmsp97.pdf.

* cited by examiner

ADAPTIVE QUALITY OF SERVICE FOR WIDE AREA NETWORK TRANSPORT

TECHNICAL FIELD

This disclosure relates in general to the field of computer networking and, more particularly, to techniques for providing adaptive quality of service for Wide Area Network ("WAN") transport.

BACKGROUND

Multi Protocol Label Switching ("MPLS") has been the primary technology for WAN transport for many years due in part to the fact that it can reliably deliver packets at high speeds. Enterprise branch offices may use MPLS links to connect to headquarters or data centers. On the other hand, access link technologies, such as Digital Subscriber Line ("DSL"), cable modems, and 3G/4G links have advanced in recent year to the point that they can achieve higher speed and link reliability at a lower cost; in contrast, MPLS links are rather expensive to operate and maintain. As a result, enterprise networks are increasingly using Internet cloud for their other classes of traffic. The challenge is how to leverage low-cost Internet links in a WAN access strategy and improve the Quality of Service ("QoS") of Internet links so that they can approach the performance of MPLS.

Traffic shaping is a form of rate limiting and may be employed to provide differentiated service treatment among different traffic classes. In particular traffic shaping provides a means by which to control the volume of traffic being sent on a link during specific period of time and by virtue of it also controls better service for important traffic over less important or best effort traffic.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
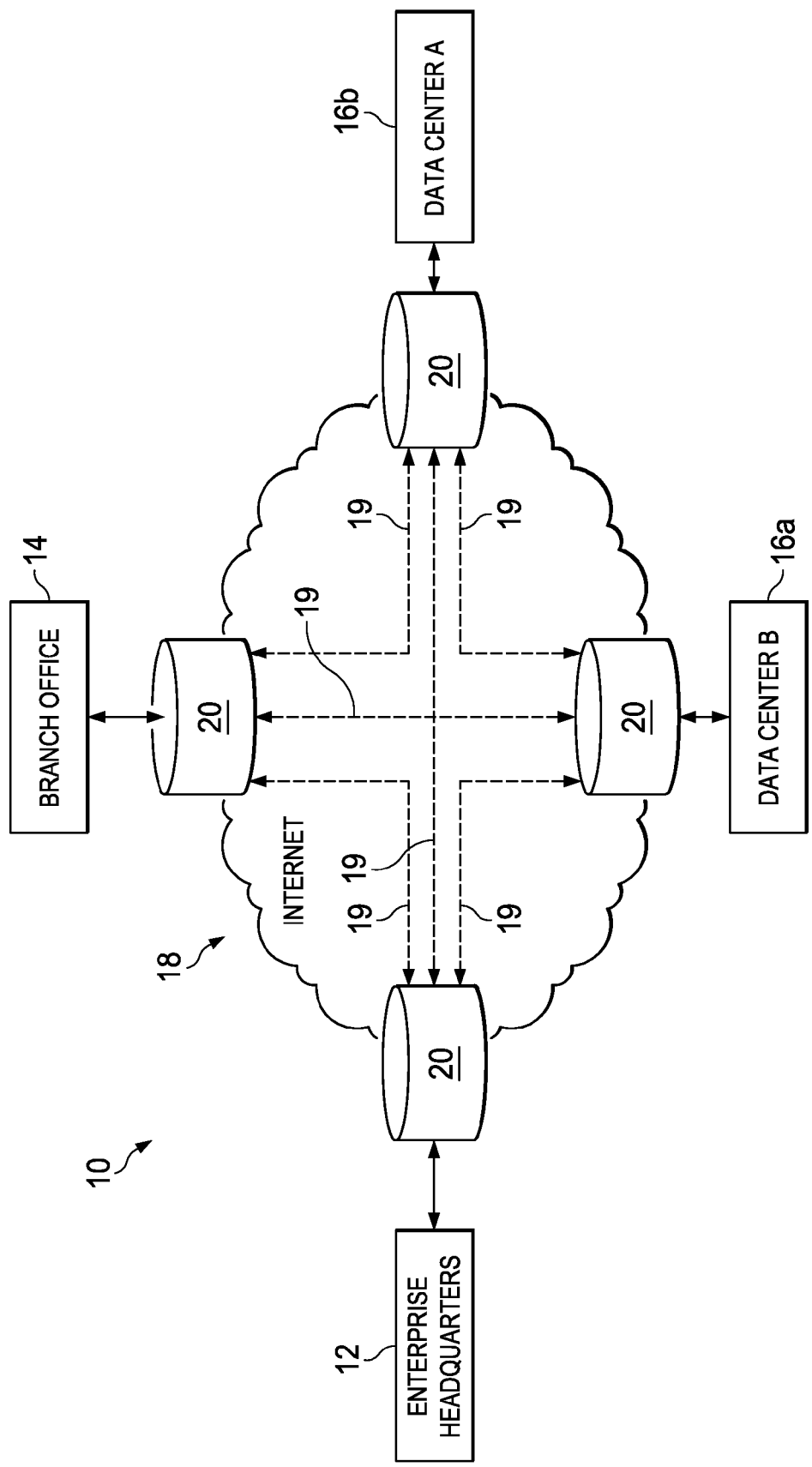
FIG. 1 is a simplified block diagram of a data communications environment in which an adaptive data rate control process in accordance with embodiments described herein may be implemented.

An example method is provided and includes determining a time shift comprising a difference in time between a packet count observation at a transmit element and a corresponding packet count observation at a receive element connected to the transmit element via a link; obtaining a first packet count from the transmit element and a second packet count from the receive element, in which the first packet count comprises an indication of a number of packets sent by the transmit element during a predetermined time period and the second packet count comprises an indication of a number of packets received at the receive element during the predetermined time period; and adjusting at least one of the first packet count and the second packet count to compensate for the time shift. The method further includes comparing the adjusted first and second packet counts to determine whether there is a discrepancy between the counts and, if a discrepancy is detected between the counts, adjusting a rate at which the transmit element sends packets to the receive element. In some embodiments, the determining is performed during a training period and includes estimating the time shift. The method may further include periodically repeating the determining.

The method may also include, if a discrepancy is not detected between the counts, determining whether a predetermined time period has expired since a discrepancy was last detected, and, if the predetermined time period has expired, increasing the rate at which the transmit element sends packets to the receive element. In some embodiments, the obtaining, adjusting, and comparing are periodically repeated. The link may be a Wide Area Network ("WAN") link, which may be implemented using an Internet.

Example Embodiments

Typically, customers deploy some sort of Virtual Private Network ("VPN") technology over the Internet with some level of QoS control at the enterprise edge of the Internet. For example, in Dynamic Multipoint VPN ("DMVPN") networks, finer granular QoS is enabled over tunnel endpoints at the hub and spoke. However, Internet link speeds fluctuate over time. If bottlenecked in the Internet by limited bandwidth, packets may be dropped randomly without any QoS guarantees, or may be queued up in a bloated buffer inside the Internet. To avoid indiscriminate drops over the Internet or incurring high latency for delay-sensitive applications (e.g., video conferencing) in such cases, customers may desire to implement traffic shaping (in the form of rate shaping) at the enterprise transmit edge (e.g., at hub and spoke in DMVPN connections) to adapt to Internet available bandwidth. This will enable control of differentiated drops at the enterprise edge, thus reducing/avoiding drops and/or excessive delay over the Internet path. With traffic shaping, the experienced bottleneck can be effectively brought back into the access links over which control may be exercised and decisions can be made as to how to share the scarce bandwidth among different applications and thereby improve QoS to applications.

Current approaches to determining bottleneck link bandwidth, or simply "bottleneck bandwidth," include performing periodic traffic probing of the link, which involves sending active back-to-back packets into the network. This process will necessarily introduce extra overhead traffic over what may be an already congested link. Determining the bottleneck link bandwidth quickly without using traffic probing is a challenge. Embodiments described herein provide a simple, dynamic rate adaptation control process ("DRAC") based on coarse transmit and receive data counts obtained from a sender (or transmitter) and receiver node pair connected by a link, the bottleneck bandwidth of which may fluctuate over time. From these data counts, the DRAC can automatically and adaptively determine the bottleneck bandwidth of the link and shape the transmission rate at the sender node accordingly.

Referring now to FIG. 1, shown therein is a simplified block diagram of a data communications system 10 in accordance with one embodiment. In the embodiment illustrated in FIG. 1, the system 10 comprises an enterprise system and includes a variety of enterprise components, such as an enterprise headquarters 12, a branch office 14, and data centers 16A and 16B. The enterprise components may (and will very likely) be geographically dispersed nationally and internationally and are interconnected via a WAN, which in some embodiments may be implemented using the Internet 18. A VPN, represented by dashed lines 19, may be deployed over the Internet 18 to provide some level of QoS control at tunnel endpoints 20 disposed at the enterprise edges of the Internet.

Each of the tunnel endpoints 20 may be implemented using a router and each router may alternatively function as a transmitter, or source, of data packets and a receiver, or sink, of data packets. In accordance with features described herein, DRAC utilizes a transmitter and receiver pair to provide adaptive QoS. As will be described in greater detail below, a transmitter is intelligent and is capable of determining a shaped rate based on transmit and receive count differences, while a receiver is passive and feeds receive counter values back to the transmitter at periodic intervals. The transmitter transmits packets to the receiver at a shaped rate. Some of those packets will be received at the receiver; others will be dropped. The challenges faced by the transmitter in shaping the packet transmission rate include (1) time variance of the available bandwidth on the link between the transmitter and the receiver; (2) time variance of the traffic pattern on the link between the transmitter and the receiver; and (3) time shifting, or time offset, of the observations between the transmitter and the receiver. In accordance with features of embodiments described herein, the DRAC is able to detect losses and adaptively adjust the shaped rate early enough and remain robust to noise in the data.

Figure 2:
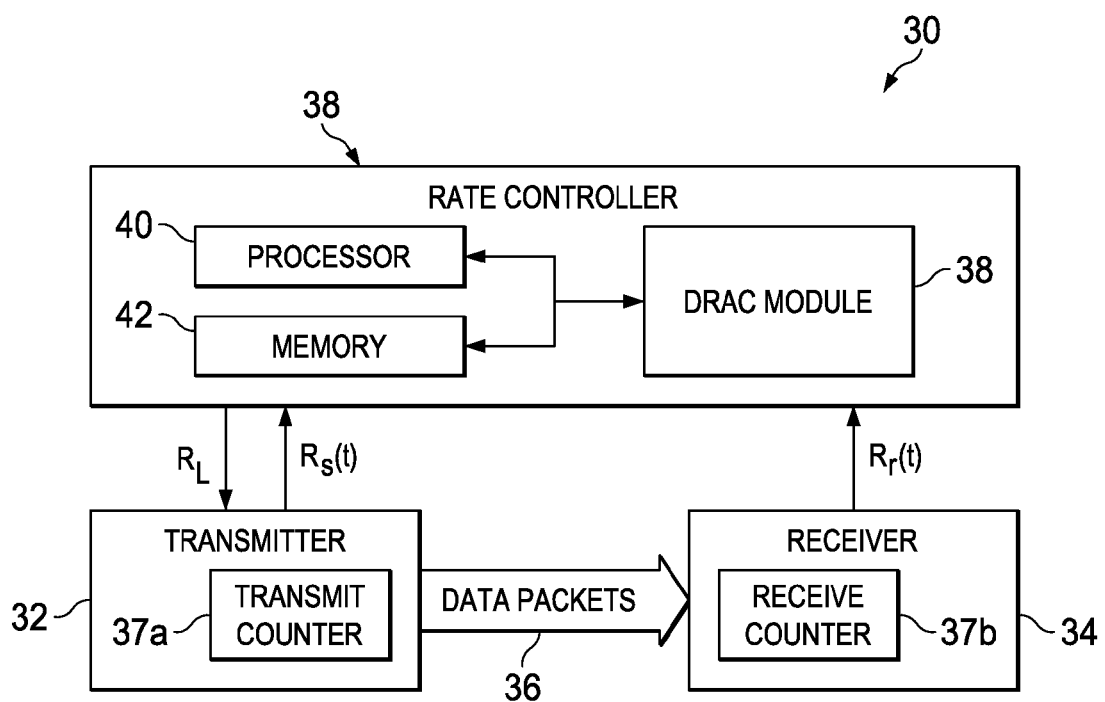
FIG. 2 is a more simplified block diagram of a data communications environment for implementing an adaptive data rate control process in accordance with embodiments described herein.

FIG. 2 illustrates a more simplified block diagram of a system 30 for implementing a DRAC in accordance with embodiments described herein. As shown in FIG. 2, the system 30 includes a transmitter, or sender, element 32 for transmitting data packets to a receiver element 34 via a data communications link 36. The data communications link 36 may include an Internet path with time-varying bottleneck bandwidth. Transmitter element 32 includes a transmit counter 37A for counting a number of packets sent by transmitter element during a particular time period. Similarly, receiver element 34 includes a receive counter 37B for counting a number of packets received by receiver element during a particular time period. In accordance with features of embodiments described herein, each of endpoints 20 (FIG. 1) may comprise a transmitter element 32 and/or a receiver element 34. As illustrated in FIG. 2, a rate controller 38 is provided and includes a processor 40, memory element 42, and a DRAC module 44 for implementing the DRAC as will be described in greater detail hereinbelow. In accordance with features of one embodiment, the rate controller 38 periodically collects from transmitter element 32 (and particularly, transmit counter 37A) data sent rate information ($R_s$) indicating the number of packets sent during the sample period. Similarly, the rate controller 38 periodically collects from receiver element 34 (and particularly, receive counter 37B) data received rate information ($R_r$) indicating the number of packets received during the sample period. It will be noted that in some embodiments, the transmit counter 37A and receive counter 37B after respective data rate information is provided to rate controller 38; in other implementations, counters 37A, 37B, will continue to count up with cumulative information being used to calculate and report rate information.

As will be described in greater detail below, rate controller 38 employs the DRAC module 44 to determine an adjusted data transmission (or data sent) rate based on the data sent rate $R_s$ and data received rate $R_r$ and provides a control signal ($R_L$) to the transmitter 32 to cause the transmitter to adjust the transmission rate accordingly. In general, if the rate of transmission is determined by the DRAC module 44 to be too high compared to the current conditions (e.g., bottleneck bandwidth) of the of the communications link 36, rate controller 38 will instruct the transmitter element 32 to reduce the data sent rate. In contrast, if the rate of transmission is determined by the DRAC module 44 to be too low compared to the current conditions of the communications link 36, rate controller 38 will instruct the transmitter element 32 to increase the data sent rate. Finally, if the rate of transmission is determined by the DRAC module 44 to be appropriate for the current conditions of the communications link 36, rate controller 38 will instruct the transmitter element 32 to maintain the current data sent rate.

It should be noted that, although the rate controller 38 is illustrated in FIG. 2 as comprising an independent component, in certain embodiments, rate controller will be integrated into the transmitter element 32. It is also conceivable that the rate controller 38 could be integrated into the receiver element 34, although this may result in a less efficient DRAC system.

Figure 3:
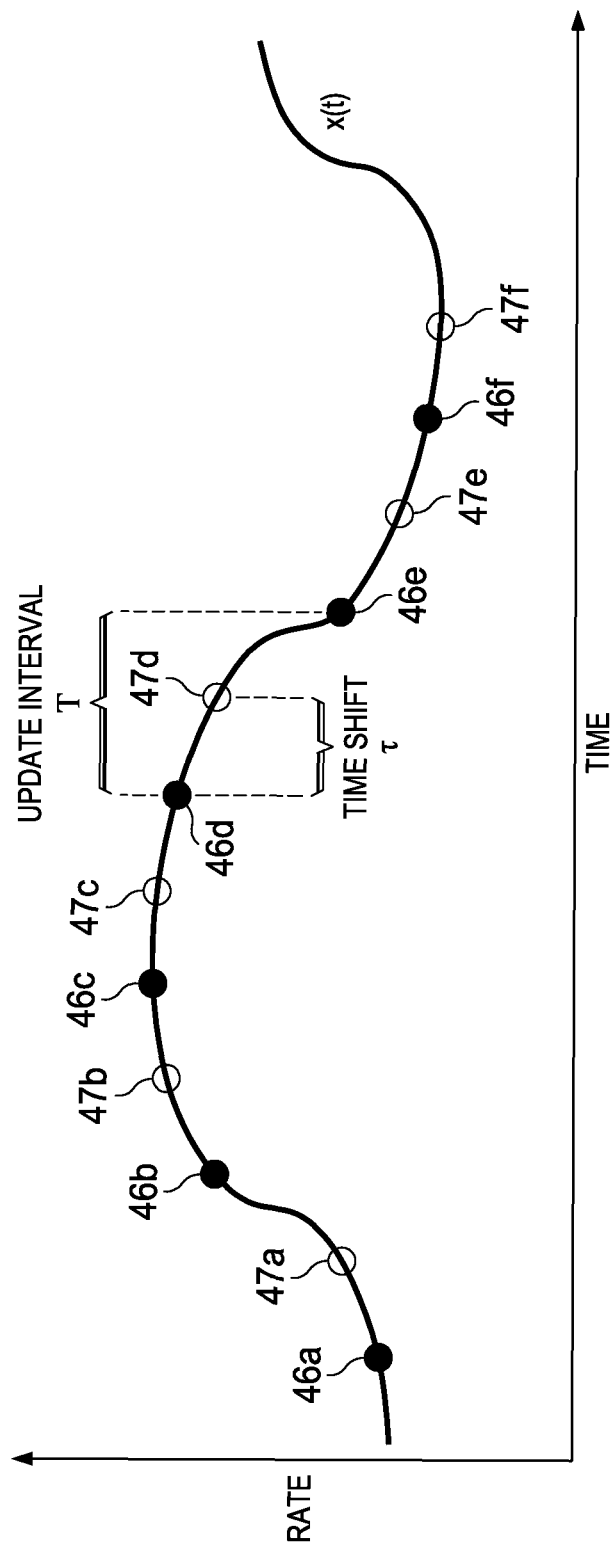
FIG. 3 is a graph illustrating a time shift and an update interval in connection with an adaptive data rate control process in accordance with features of embodiments described herein.

FIG. 3 illustrates a plurality of rate observations periodically obtained by rate controller 38 (FIG. 2) from transmitter 32, designated by reference numerals 46A-46F, and a plurality of rate observations periodically obtained by rate controller from receiver 34, designated by reference numerals 47A-47F. As shown in FIG. 3, a time shift, or time offset, τ represents the difference in time between a rate observation from the transmitter (e.g., packet count 46D) and a corresponding rate observation from the receiver (packet count 47D). This time shift, or offset, is due to the fact that the transmit and receive elements trigger their counters at different times, since the two elements are not synchronized. For example, the transmit element may count outgoing packets at times t=2 s, t=12 s, t=22 s, and so on, with a measurement, or update, interval T=10 s. In contrast, the receiver may count incoming packets at times t=5 s, t=15 s, t=25 s, and so on with the same measurement, or update, interval T=10 s. The update interval T corresponds to the interval at which observations are made. In one embodiment, T may be set to five seconds, for example. In other embodiments, T may be set to 10 seconds. It will be recognized that the value of T will be highly dependent on the system in which the DRAC is implemented, as well as the particular application thereof and the value of $\tau$.

Figure 4:
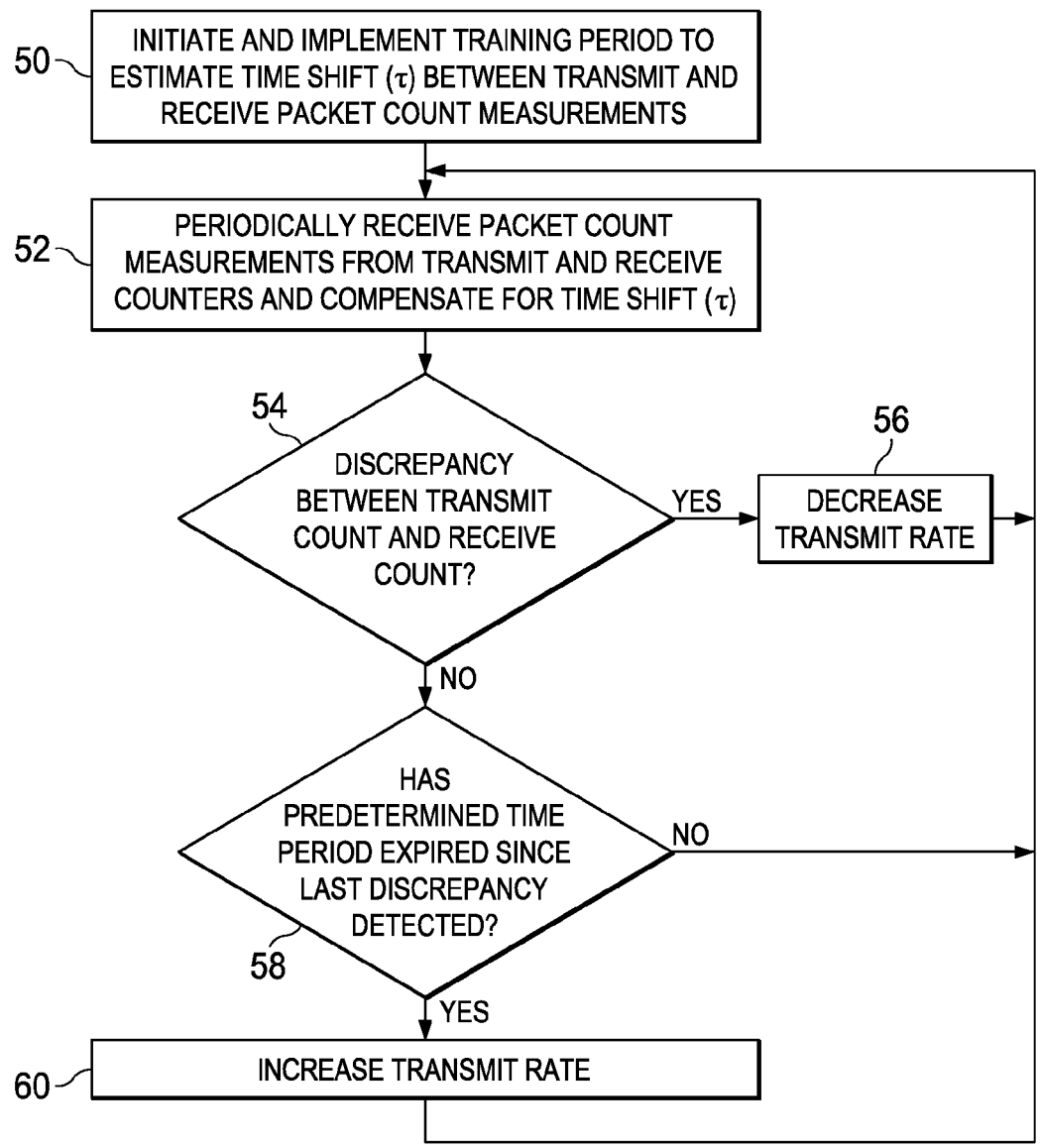
FIG. 4 is a flowchart illustrating operation of an adaptive data rate control process implemented in accordance with features of embodiments described herein.

FIG. 4 is a flowchart illustrating operation of the DRAC module 44 in accordance with embodiments descried herein. In step 50, a training period is initiated and is used to estimate the time shift, or time offset, between the transmit and receive counters. Once the time shift has been estimated, in step 52, the time shift is compensated for by adjusting the value of the current transmit count, as will be described in detail below with reference to FIG. 6. In step 54, the difference between the adjusted transmit count and the current receive count is used to determine whether a non-negligible discrepancy exists between sent and received traffic rates. Such a non-negligible discrepancy may be an indication of either packet loss or excessive queuing delay build-up over the link due to the bottleneck bandwidth thereof. If it is determined in step 54 that a non-negligible discrepancy exists between sent and received traffic rates, in step 56, the transmitter is instructed (e.g., via control signal $R_L$) to decrease the transmit rate to shape the traffic to a preconfigured percentage (e.g., 95%, for example) of the available bandwidth of the link between the sender and the receiver. Using a percentage close, but not equal, to 100% of the bandwidth is meant to maximize link utilization without congesting the link. Execution then returns to step 52 to await the next sample. If non-negligible discrepancy is not detected in step 54, execution proceeds to step 58, in which a determination is made whether a predetermined period of time (e.g., 100 seconds, for example) has expired since the last time a non-negligible discrepancy was detected in step 54. If not, execution returns to step 52 to await the next sample period; otherwise, execution proceeds to step 60, in which the transmitter is instructed (e.g., via control signal $R_L$) to increase the transmit rate by a predetermined amount (e.g., a percentage of the bottleneck link bandwidth). It will be noted that the training (step 50) may be periodically re-initiated to insure that r has not changed over time. It will be further noted that in some embodiments, the predetermined time period utilized in step 58 may be configurable.

An embodiment of the training period executed in step 50 (FIG. 4) will be described in greater detail below. The following variables are defined in connection with the description of the training period:

t index of time;
c(t) time-varying capacity over WAN path
x(t) instantaneous sending rate at the transmitter
y(t) instantaneous receiving rate at the receiver
X(t) cumulative sending rate at the transmitter
Y(t) cumulative receiving rate at the receiver
n index of discrete time sampling at transmitter/receiver
T update interval at transmitter/receiver
$T_x$ start time of sampling at transmitter
$T_y$ start time of sampling at receiver
$\tau$ time shift between transmitter and receiver $\tau = T_y - T_x$
x[n] measured sending rate at the transmitter at time $t = T_x + nT$
y[n] measured sending rate at the transmitter at time $t = T_y + nT$
X[n] cumulative sending rate at the transmitter at time $t = T_x + nT$
Y[n] cumulative sending rate at the transmitter at time $t = T_y + nT$
$\rho$ interpolation coefficient The goal of time shift estimation is to estimate the value of time shift $\tau = T_y - T_x$ based on N training samples from the transmitter and receiver. For the purpose of time shift estimation, it will be assumed that during the training period, the instantaneous transmitting and receiving rates are the same and below available path capacity. For ease of notations, it will be denoted henceforth $r(t) = x(t) = y(t) \leq c(t)$, along with its cumulative form $R(t) = \int_0^t r(t')dt'$.

For the sake of simplicity, the effect of propagation delay (typically on the order of sub-seconds and therefore significantly smaller than the update interval T) will be ignored. The following can then be mathematically expressed:

$$x[n] = \frac{1}{T}\int_{T_x+(n-1)T}^{T_x+nT} r(t)dt \quad (1)$$

$$y[n] = \frac{1}{T}\int_{T_x+(n-1)T}^{T_y+nT} r(t)dt \quad (2)$$

$$X[n] = \sum_{n'=1}^{n} x[n'] = \frac{1}{T}\int_{T_x}^{T_x+nT} r(t)dt = R(T_x+nT) - R(T_x) \quad (3)$$

$$Y[n] = \sum_{n'=1}^{n} y[n'] = \frac{1}{T}\int_{T_y}^{T_y+nT} r(t)dt = R(T_y+nT) - R(T_y). \quad (4)$$

Figure 5:
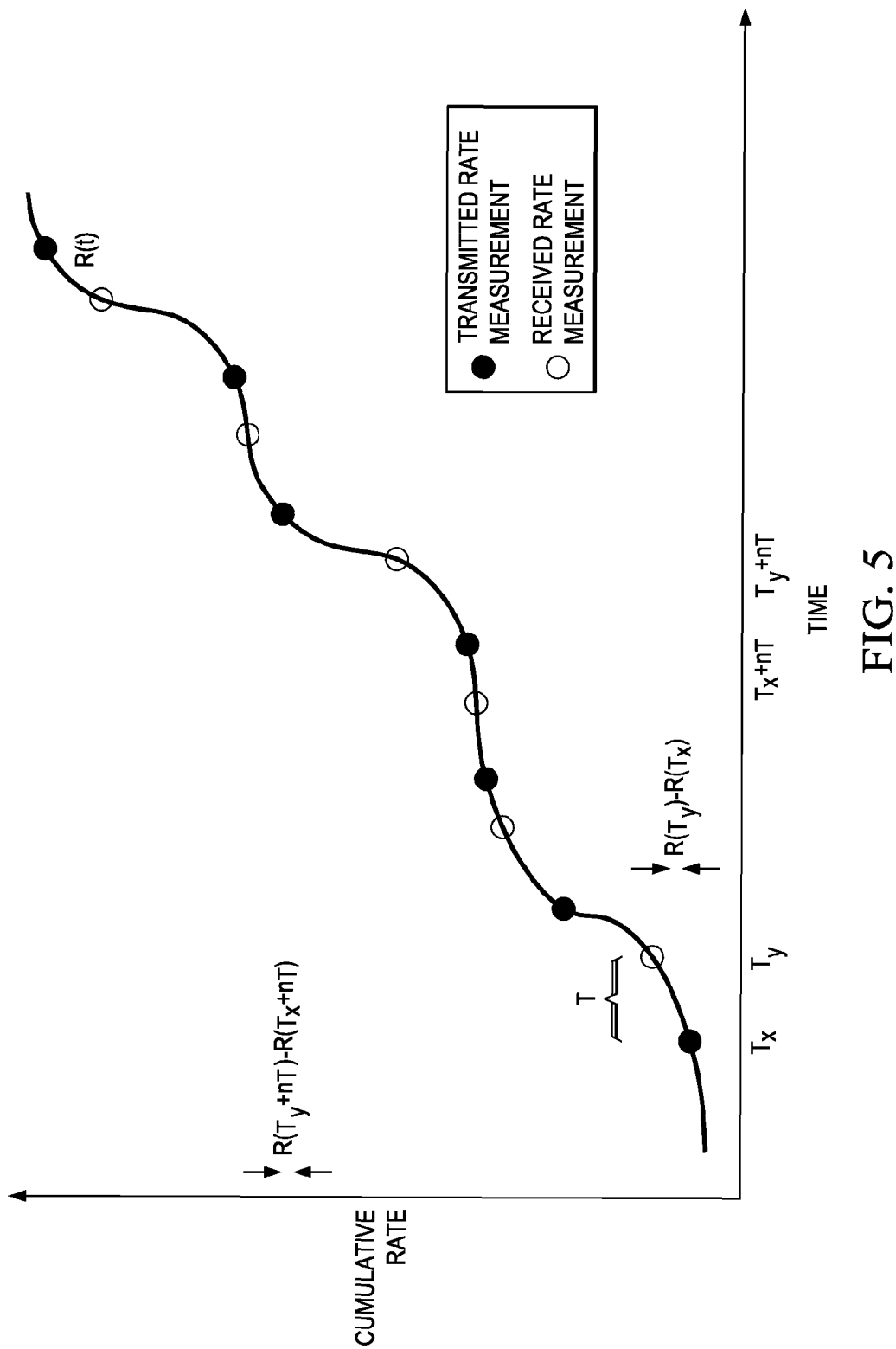
FIG. 5 is a graph illustrating cumulative transmitter rate and cumulative receiver rate measurements over time in connection with an adaptive data rate control process in accordance with features of embodiments described herein.

Referring to FIG. 5, a first transmitted packet count is noted at time $T_x$ while a first received packet count is noted at a time $T_y$. As illustrated in FIG. 5, the cumulative difference between the transmitter rate and receiver rate is:

$$X[n] - Y[n] = R(T_x + nT) - R(T_y + nT) + R(T_y) - R(T_x),$$

which tends to vary along with r(t).

Consider the cumulative difference between the interpolated transmitter rate and the receiver rate as:

$$\delta R[n] = (1-\rho)X[n] + \rho X[n+1] - Y[n] \quad (6)$$
$$= (1-\rho)R(T_x + nT) + \rho R(T_x + (n-1)T) -$$
$$R(T_y + nT).$$

Here, the interpolation coefficient is $\rho = \tau/T$ when the time shift is known. In the special case in which R(t) is a piece-wise linear function, or equivalently, when the instantaneous rate function r(t) is a piece-wise constant, such first-order interpolation yields zero residual error: $\delta R[n] = 0$.

In the more general case, and when $\tau$ is unknown, the best value of $\rho$ may be estimated by solving for the following:

$$\min_{\rho} \sum_{n=1}^{N-1} ((1-\rho)X[n] + \rho X[n+1] - Y[n])^2 \quad (7)$$

s.t. $0 < \rho < 1$.

For notation simplicity, vectors a and b can be denoted:

$$a = \{a_n \mid a_n = X[n+1] - X[n]\}_{n=1}^{N-1}$$
$$b = \{b_n \mid b_n = Y[n] - X[n]\}_{n=1}^{N-1}.$$

such that equation (7) becomes:

$$\min_{\rho} \|a\rho - b\|_2. \quad (8)$$

s.t. $0 < \rho < 1$.

Here $\|\cdot\|_2$ demotes the L-2 norm of a vector. Equation (8) is hence in fairly standard form of minimizing least-squared error subjecting to a linear constraint. The optimal value for interpolation coefficient ρ can be derived as:

$$\hat{\rho} = \frac{\sum_n b_n}{\sum_n a_n} = \frac{\sum_{n=1}^{N-1} Y[n] - X[n]}{\sum_{n=1}^{N-1} X[n+1] - X[n]} \quad (9)$$

Figure 6:
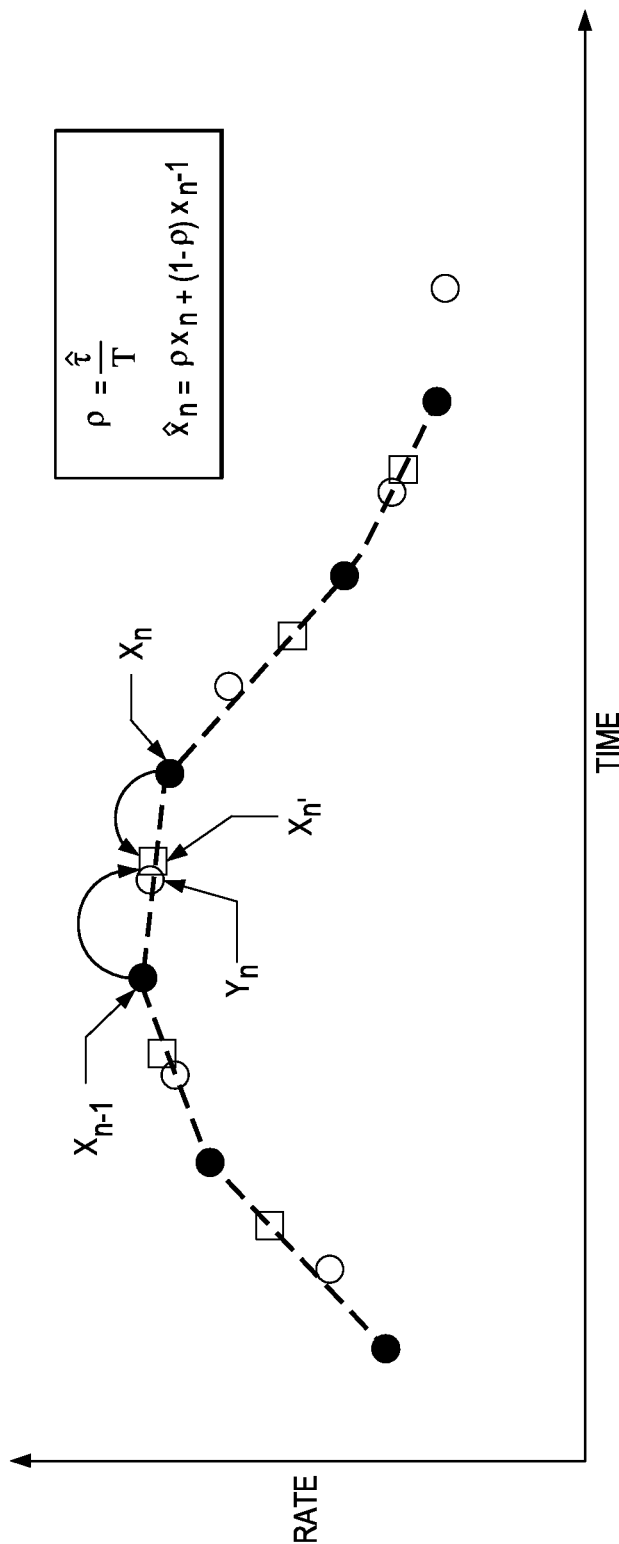
FIG. 6 is a graph illustrating a visual representation of calculation of an adjusted transmitted data count using linear interpolation performed in connection with an adaptive data rate control process in accordance with features of embodiments described herein.

FIG. 6 is a graph illustrating adjustment of the transmit count to compensate for time shift referred to in step 52 (FIG. 4). As illustrated in FIG. 6, a linear interpolation of a transmit count (designated in FIG. 6 as $x_n$) and an immediately preceding transmit count (designated in FIG. 6 as $x_{n-1}$) in combination with the interpolation coefficient ρ are used to develop an adjusted transmit count (designated in FIG. 6 as $x_n'$) using the following equation:

$$x_n' = \rho x_n + (1-\rho) x_{n-1}$$

The difference between the adjusted transmit count $x_n'$ and corresponding receive count (designated in FIG. 6 as $y_n$) indicates the discrepancy between the two counts (determined in step 54 of FIG. 4).

Figure 7:
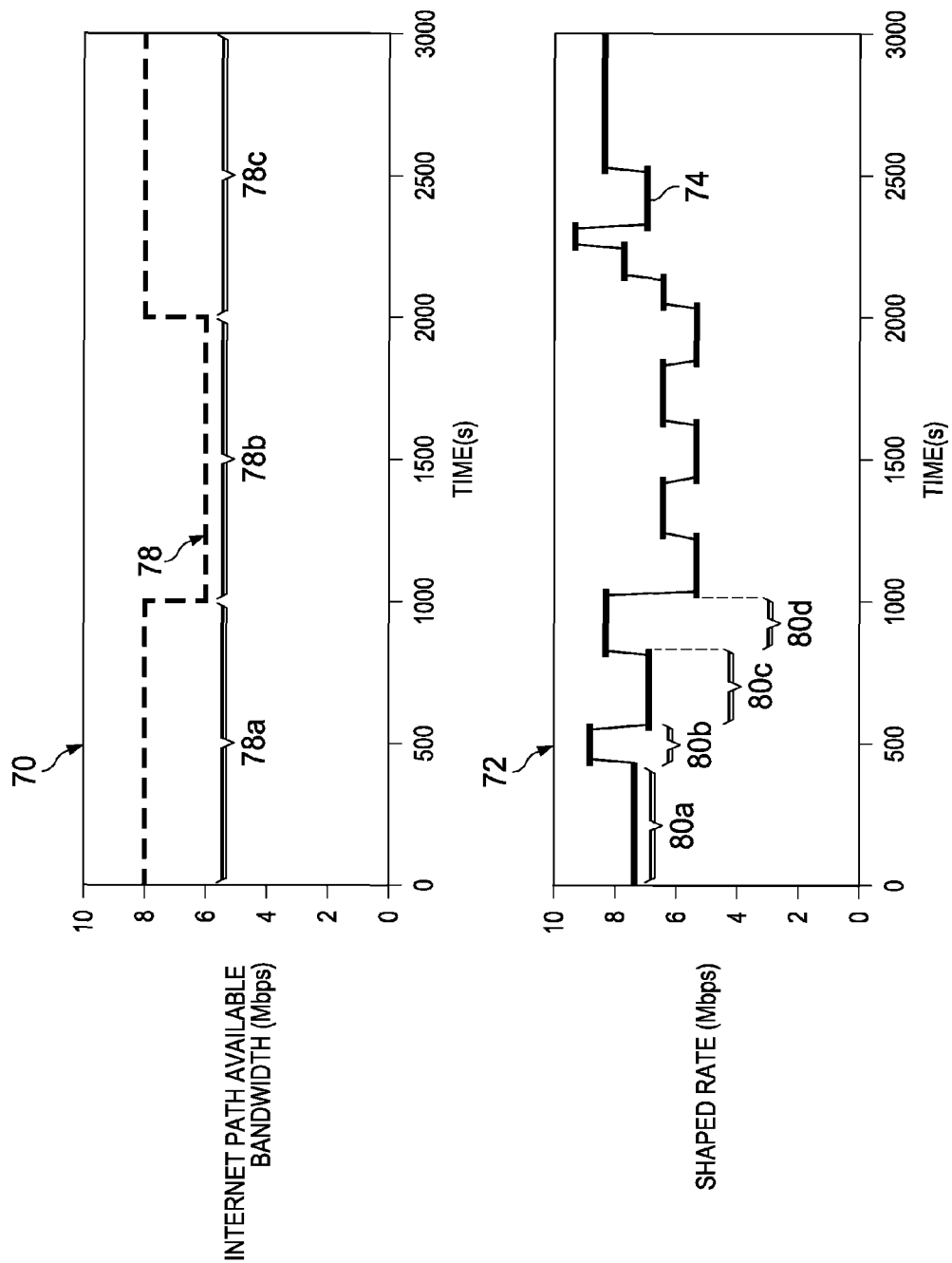
FIG. 7 is a pair of graphs illustrating an example effect of an adaptive rate control process implemented in accordance with features of embodiments described herein.

FIG. 7 comprises a pair of graphs 70, 72, illustrating responsiveness of the DRAC of embodiments described herein to adapt a shaped rate, illustrated in graph 72 by a line 74, to an available bandwidth over the Internet path, illustrated in graph 70 by a line 78. As shown in FIG. 7, the available bandwidth over the Internet path 78 is 8 Mbps for a first time period 78A, falls to 6 Mbps for a second time period 78B, and returns to 8 Mbps for a third time period 78C. The shaped rate 74 remains just under 8 Mbps for a time period 80A then jumps to approximately 9 Mbps, in response to no change being made for a predetermined time period (FIG. 4, steps 54, 58, 60), for a time period 80B. The shaped rate 74 then drops below 8 Mbps, in response to detection of a non-negligible discrepancy between transmit and receive counts (FIG. 4, steps 54, 56), for a time period 80C. Once again, the shaped rate 74 jumps to approximately 9 Mbps for a time period 80D for reasons previously identified. The shaped rate 74 reacts similarly to the available bandwidth over the Internet path for the rest of the illustrated time period, with the shaped rate periodically being raised above the available bandwidth over the Internet path and then dropping back below the bandwidth in reaction to additional bandwidth and/or detected packet losses.

Embodiments described herein include a novel method of performing adaptive QoS for WAN traffic. The DRAC operates on aggregate traffic over a WAN connection at the router, passively and coarsely observes the sending and receive packet counts with minimal signaling overhead from receiver to transmitter, and dynamically determines the local shaping rate for outgoing traffic. By shaping the outgoing traffic at a rate slightly lower than available bandwidth over the Internet (i.e., bottleneck link bandwidth), over-utilization of the WAN connection can be proactively avoided, while enabling packet prioritization among different applications (e.g., video conferencing vs. file transfer) instead of incurring packet drops or excessive delay over the Internet. The design responds quickly to a decrease in available bandwidth over the Internet path and also intelligently increases the shaping rate after available bandwidth over the Internet path recovers. In addition, the design includes a method of estimating and compensating for the time shift between sender and receiver packet count measurements using a maximum likelihood estimator. Additionally, embodiments described herein avoid the use of active traffic probing, relying instead on passive observation of aggregate traffic at the sender and receiver and minimal signaling overhead (e.g., one receiver report every five or ten seconds) from receiver to sender.

Although the examples are described with reference to WAN transport, it will be recognized that the techniques are equally applicable to other network technologies. In one example implementation, various devices involved in implementing the embodiments described herein can include software for achieving the described functions. For example, referring to FIG. 2, the transmitter and receiver elements 32, 34, may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIG. 4. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in FIG. 4 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIG. 4. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   determining a time shift comprising a difference in time between a packet count observation at a first node and a corresponding packet count observation at a second node connected to the first node via a link;
   obtaining a first packet count from the first node and a second packet count from the second node, wherein the first packet count comprises an indication of a number of packets sent by the first node to the second node during a first predetermined time period and the second packet count comprises an indication of a total number of packets received at the second node from the first node during the first predetermined time period;
   adjusting a value of at least one of the first packet count to compensate for the time shift;
   subsequent to the adjusting, comparing the first and second packet counts to determine whether there is a difference between the first and second packet counts; and
   responsive to detection of a difference between the first and second packet counts, adjusting a rate at which the first node sends packets to the second node.

2. The method of claim 1, wherein the determining is performed during a training period and comprises estimating the time shift.

3. The method of claim 1 further comprising periodically repeating the determining.

4. The method of claim 1 further comprising:
   responsive to no difference being detected between the first and second packet counts, determining whether a second predetermined time period has expired since any difference was last detected; and
   responsive to a determination that the second predetermined time period has expired, increasing the rate at which the first node sends packets to the second node.

5. The method of claim 4 further comprising periodically repeating the obtaining, adjusting, and comparing.

6. The method of claim 1, wherein the link is a Wide Area Network ("WAN") link.

7. The method of claim 6, wherein the WAN is implemented using an Internet.

8. Non-transitory tangible media having encoded thereon logic that includes instructions for execution and when executed by a processor operable to perform operations comprising:
- determining a time shift comprising a difference in time between a packet count observation at a first node and a corresponding packet count observation at a second node connected to the first node via a link;
- obtaining a first packet count from the first node and a second packet count from the second node, wherein the first packet count comprises an indication of a number of packets sent by the first node to the second node during a first predetermined time period and the second packet count comprises an indication of a total number of packets received at the second node from the first node during the first predetermined time period;
- adjusting a value of at least one of the first packet count to compensate for the time shift;
- subsequent to the adjusting, comparing the first and second packet counts to determine whether there is a difference between the first and second packet counts; and
- responsive to detection of a difference between the first and second packet counts, adjusting a rate at which the first node sends packets to the second node.

9. The media of claim 8, wherein the determining is performed during a training period and comprises estimating the time shift.

10. The media of claim 8, wherein the operations further comprise periodically repeating the determining.

11. The media of claim 8, wherein the operations further comprise:
- responsive to no difference being detected between the first and second packet counts, determining whether a second predetermined time period has expired since any difference was last detected; and
- responsive to a determination that the second predetermined time period has expired, increasing the rate at which the first node sends packets to the second node.

12. The media of claim 11, wherein the operations further comprise periodically repeating the obtaining, adjusting, and comparing.

13. The media of claim 8, wherein the link is a Wide Area Network ("WAN") link.

14. The media of claim 13, wherein the WAN is implemented using an Internet.

15. An apparatus, comprising:
- a memory for storing data; and
- a processor operable to execute instructions associated with the data, wherein the processor and the memory cooperate such that the apparatus is configured for:
  - determining a time shift comprising a difference in time between a packet count observation at a first node and a corresponding packet count observation at a second node connected to the first node via a link;
  - obtaining a first packet count from the first node and a second packet count from the second node, wherein the first packet count comprises an indication of a number of packets sent by the first node to the second node during a first predetermined time period and the second packet count comprises an indication of a total number of packets received at the second node from the first node during the first predetermined time period;
  - adjusting a value of at least one of the first packet count to compensate for the time shift;
  - subsequent to the adjusting, comparing the first and second packet counts to determine whether there is a difference between the first and second packet counts; and
  - responsive to detection of a difference between the first and second packet counts, adjusting a rate at which the first node sends packets to the second node.

16. The apparatus of claim 15, wherein the apparatus is further configured for periodically repeating the determining.

17. The apparatus of claim 15, wherein the apparatus is further configured for:
- responsive to no difference being detected between the first and second packet counts, determining whether a second predetermined time period has expired since any difference was last detected; and
- responsive to a determination that the second predetermined time period has expired, increasing the rate at which the first node sends packets to the second node.

18. The apparatus of claim 17, wherein the apparatus is further configured for periodically repeating the obtaining, adjusting, and comparing.

19. The apparatus of claim 15, wherein the link is a Wide Area Network ("WAN") link.

20. The apparatus of claim 19, wherein the WAN is implemented using an Internet.

* * * * *